(12) United States Patent
Baumhöfer

(10) Patent No.: US 6,439,287 B1
(45) Date of Patent: Aug. 27, 2002

(54) VEHICULAR TIRE HAVING A CARCASS WITH SIDEWALLS AND TREAD, PROCESS OF MAKING VEHICLE TIRE, AND PROCESS OF MASKING AN OVERLAPPING PORTION OF CARCASS PLY NEEDS

(75) Inventor: Johannes Josef Baumhöfer, Wedemark (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/506,002

(22) Filed: Feb. 17, 2000

(30) Foreign Application Priority Data

Feb. 18, 1999 (DE) .......................... 199 06 658

(51) Int. Cl.$^7$ .......................... B29D 30/72; B60C 13/00; B60C 13/02
(52) U.S. Cl. .................... 152/523; D12/605; 156/110.1; 156/123; 156/130.7; 156/134
(58) Field of Search ................................ 152/523, 524; D12/605; 156/110.1, 130.7, 134, 123

(56) References Cited

FOREIGN PATENT DOCUMENTS

| DE | 4111345 A1 | 11/1991 |
|---|---|---|
| EP | 0239160 B1 | 8/1992 |
| EP | 0407134 B1 | 1/1993 |
| JP | 07164831 A | * 6/1995 ................ 152/523 |

OTHER PUBLICATIONS

Patent Abstract of Japan No. 07164831 A, published Jun. 27, 1995, Bridgestone Corp.

\* cited by examiner

*Primary Examiner*—Adrienne C. Johnstone
(74) *Attorney, Agent, or Firm*—Greenblum & Bernstein, P.L.C.

(57) ABSTRACT

Vehicular tire and process of making the same. The tire includes a carcass made of rubber, sidewalls, and tread. The carcass, in a sidewall region, includes at least one carcass ply having parallel textile reinforcements embedded in the rubber and two carcass ply ends, and the two carcass ply ends are arranged to overlap in a circumferential direction, thereby forming an overlapping point. A sidewall rubber strip is positioned to cover the carcass in the sidewall region, and a moiré pattern is formed on the sidewall rubber strip. The process includes circumferentially overlapping the two carcass ply ends of the carcass, thereby forming an overlapping region, covering the overlapping region on the outside with a sidewall rubber strip, and forming a moiré pattern on the sidewall rubber strip.

32 Claims, 13 Drawing Sheets

VEHICULAR TIRE HAVING A CARCASS WITH SIDEWALLS AND TREAD, PROCESS OF MAKING VEHICLE TIRE, AND PROCESS OF MASKING AN OVERLAPPING PORTION OF CARCASS PLY NEEDS

BACKGROUND OF THE INVENTION

1. Field of the Invention

The present invention relates to a vehicular tire having a carcass, e.g., a radially constructed carcass, with sidewalls and tread, as well as a process of making the vehicular tire and a process of masking an overlapping region of carcass ply ends in the vehicular tire.

2. Discussion of Background Information

Building vehicular tires from several different layers from a radially inwardly direction to a radially outwardly direction is known, e.g., in tires of radial construction having an inner layer, carcass, belt, and tread, and in the side region having an inner layer, carcass, and side part. Further, carcasses of vehicular tires are customarily built from one or more plies of reinforcements which are embedded in rubber parallel to one another. The individual carcass plies in this case are made of continuous rubber strips having reinforcements arranged parallel in the direction of the rubber strip. Depending on the desired bias position or orientation of the reinforcements to the tire equator plane, the rubber strips provided with embedded reinforcements are customarily cut into individual pieces on the bias in the later tire building or crosswise (transversely) for radial carcass building. The uncut sides of the resulting pieces, which previously represented the sides of the rubber strip, are then customarily joined together to form a continuous carcass ply. Thus, as soon as the carcass length desired for the circumference of the tire is achieved, the carcass ply formed from the individual carcass pieces cut on the bias or transversely is laid on the building drum on the previously prepared inner layer, on a carcass layer already placed there, or, if necessary, on additional interlayers. Thus, the carcass ply is laid around the entire circumference and is customarily joined together at its end regions, with individual reinforcements overlapping. Then, depending on the desired design, additional carcass layers, interlayers, belt plies, and tread are applied. During the manufacturing process, it is customary to produce the desired preform shape by expanding the building drum, which has been provided with the carcass plies, in the radial direction during shaping.

After the vulcanization and finishing of the tire, as soon as it is pumped up to its operational state, thickened points produced by the overlapping of several reinforcements in the carcass structure, e.g., in the outer carcass ply, become noticeable, e.g., from the exterior of the tire, and give an unattractive appearance. In this regard, the reinforcements are strongly stretched by the shaping and are shrunk during the subsequent vulcanization, resulting, e.g., in solid carcass regions. As soon as the tire in its mounted state is stressed with internal pressure, this reinforced region exhibits a considerably weaker expansion behavior than the surrounding carcass regions, which results in a differing strength and elasticity behavior of the carcass in this region, and which leads to visible constrictions. This is particularly noticeable when polyester is used for the carcass reinforcements.

Several suggestions have been made for moderating or optically masking the constrictions caused by the overlapping.

EP 0 239 160 B1, e.g., discloses that additional splicing strips can be provided in the region of the overlapping. EP 0 407 134 B1, e.g., discloses laying additional rubber strips in the overlapping region, at least in the region of the bead core. These additional strips serve as elastic cushions in the core region, so that, when there is excess internal pressure, the reinforcements in the overlapping region migrate radially outwardly from the core under elastic compression of the cushion, and, thus, the constriction ought to be largely masked. However, the quality of the masking of the constriction behavior depends upon the thickness of the rubber strip used, and depending upon the thickness of the strip, additional uniformity problems occur due to the additional strip as compared to conventional tires. Further, depending on the thickness of the rubber strip, air inclusions can form on both sides of the strip, i.e., between the layer covering the rubber strip and the carcass layer. At great expense, e.g., by additional rolling of the layer covering the rubber strip, a distribution of the air inclusions is conceivable, at least when the layers of rubber between the covering layer and the carcass are thin, but the extended covering of the carcass ply by the covering layer prevents a removal of the air inclusions. Insofar as they have been distributed from the immediate region of the rubber strip, they still essentially remain as air inclusions between the carcass and the covering layer and lead to additional problems, e.g., related to the durability of the tire. Owing to the problems that arise, satisfactory coverings of the constrictions with the aid of such an additional rubber strip can only be implemented, if at all, at high additional cost for removal of the air inclusion and for removal of the additional uniformity problems.

SUMMARY OF THE INVENTION

The present invention provides a vehicular tire having a carcass, e.g., a radially constructed carcass, with sidewalls and a tread, in which the above-noted constriction effects are simply and reliably masked.

The present invention includes a carcass that, in its sidewall region, is formed of at least one carcass ply having two carcass ply ends and parallel textile reinforcements embedded in the rubber. Further, the at least one carcass ply has at least one overlapping point of the two carcass ply ends, which are overlapped in the circumferential direction of the vehicular tire. The carcass, in its sidewall region, is covered on the outside with a sidewall rubber strip, and a moiré pattern is formed on the sidewall rubber strip from a number of linear elevations associated with, e.g., at least two non-identical families of curves.

The formation of a moiré pattern on the sidewall rubber strip from a number of linear elevations that are to be assigned, e.g., to at least two non-identical families of curves, by the distribution of the intensity of the reflected light as a result of interferences of the line patterns, causes a superposition over a region of possible constriction effects on the tire sidewall such that comparatively small changes in reflection caused by possible constriction effects are difficult to perceive with the naked eye. This can be implemented by simple devices within the scope of tire sidewall decorative design. Thus, implementation is possible without further additional measures in tire building parts or in the tire building process. Thus, the additional measures required in the above-noted documents of EP 0 239 160 B1 and EP 0 407 134 B1, as well as the attendant risks, can be omitted.

The present invention is directed to a vehicular tire that includes a carcass made of rubber, sidewalls, and tread. The carcass, in a sidewall region, includes at least one carcass ply having parallel textile reinforcements embedded in the rubber and two carcass ply ends, and the two carcass ply ends are arranged to overlap in a circumferential direction, thereby forming an overlapping point. A sidewall rubber strip is positioned to cover the carcass in the sidewall region, and a moiré pattern is formed on the sidewall rubber strip.

In accordance with a feature of the invention, the moiré pattern can include a number of linear elevations assigned to at least two non-identical families of curves. At least one family of curves can be formed from curves formed respectively parallel to one another. Further, the at least one family of curves can include at least a two families of curves, and the curves of the at least two families of curves may be formed from curves formed respectively parallel to one another. The curves of the at least two families of curves may be formed from curves formed respectively parallel to one another. Moreover, the two families of curves may intersect one another. Curves of a first of the two families of curves may be formed at an interval r1 to one another, curves of a second of the two families of curves may be formed at an interval r2 to one another, and r1=a*r2, where a is not an integer. Still further, the non-integer value of a can be approximately $1.01 \leq a \leq 1.1$.

According to another feature of the invention, the at least one family of curves can include at least a two families of curves, and the curves of at least two families of curves are formed from linear curves formed respectively parallel to one another. Curves of a first of the two families of curves may be formed at an interval r1 to one another, curves of a second of the two families of curves may be formed at an interval r2 to one another, and r1=a*r2, where a is not an integer. Further, the non-integer value of a can be approximately $1.01 \leq a \leq 1.1$.

Moreover, the at least one family of curves may be formed from curves formed respectively point-symmetrically. The at least one family of curves can include at least a two families of curves, and both of the at least two families of curves may be formed respectively point-symmetrically. Points of symmetry of the point-symmetric families of curves may be displaced from one another at an interval 1.

Further, the curves of the at least one family of curves can be concentric circles. The at least one family of curves can include at least a two families of curves having curves of concentric circles with a same center. Curves of a first of the two families of curves may be formed at a radial interval r1 to one another, curves of a second of the two families of curves may be formed at a radial interval r2 to one another, and r1=a*r2, where a is not an integer. The non-integer value of a can be approximately $1.01 \leq a \leq 1.1$.

The at least one family of curves may be formed as a family of beams through a point of symmetry. Equal angles can be provided between respectively adjacent beams. The at least one family of curves can include at least a two families of curves formed as a family of beams through a same point of symmetry. Adjacent beams of a first of the two families of curves may be formed with a same angle α between respectively adjacent beams, adjacent beams of a second of the two families of curves may be formed with a same angle β between adjacent beams, and α=a*β, where b is not an integer. Still further, the non-integer value of a can be approximately $1.01 \leq a \leq 1.1$.

According to still another feature of the invention, curves of the at least one family of curves in a two-dimensional system of coordinates (x1; x2) perpendicular to a coordinate line (x1) can intersect it at the zero values of a sine function $f(x1)=\sin(x1_0+b*x1)$ where $x1_0$=const, b=const. The at least one family of curves can include at least two families of curves, and curves of a first of the two families of curves in a two-dimensional system of coordinates (x1; x2) perpendicular to a coordinate line (x1) can intersect it at the zero values of a sine function $f(x1)=\sin(x1_0+b*x1)$ where $x1_0$=const, b=const, curves of a second of the two families of curves in a two-dimensional system of coordinates (x3; x4) perpendicular to a coordinate line (x3) can intersect it at the zero values of a sine function $f(x3)=\sin(x3_0+c*x3)$ where $x3_0$=const, c=const, and at least one of the following are satisfied: (A) one of the systems of coordinates (x1; x2) and (x3; x4) of the families of curves are not identical, (B) phase shifts $x1_0$, $x3_0$ of the families of curves are not identical, and (C) frequencies b and c of the families of curves are not identical. For the frequencies b and c of the families of curves, b=a*c, where a is not an integer, and the non-integer value of a can be approximately $1.05 \leq a \leq 1.1$. For the phase shifts, $x1_0$ and $x3_0$ of the families of curves, $x1_0=a*x3_0$, where a is not an integer, and the non-integer value of a can be approximately $1.05 \leq a \leq 1.1$.

Further, at least one of the two systems of coordinates (x1; x2) and (x3; x4) of the families of curves can be Cartesian coordinate systems, and/or both of the two systems of coordinates of the families of curves can be Cartesian coordinate systems. Further still, at least one of the two systems of coordinates (x1; x2) and (x3; x4) of the families of curves can be curvilinear coordinate systems, and/or both of the two systems of coordinates of the families of curves are curvilinear coordinate systems. Still further, at least one of the two systems of coordinates (x1; x2) and (x3; x4) of the families of curves are polar coordinate systems, and/or both of the two systems of coordinates of the families of curves are polar coordinate systems.

The present invention is directed to a process of making a vehicular tire having a carcass, sidewalls, and tread. The carcass is made of rubber and includes parallel textile reinforcements embedded in the rubber and two carcass ply ends. The process includes circumferentially overlapping the two carcass ply ends of the carcass, thereby forming an overlapping region, covering the overlapping region on the outside with a sidewall rubber strip, and forming a moiré pattern on the sidewall rubber strip.

The present invention is directed to a process of masking an overlapping portion of carcass ply ends in a vehicular tire having a carcass, sidewalls, and tread. The process includes creating a moiré pattern, and forming the moiré pattern on an outside surface of the sidewall in a region of the overlapping portion of the carcass ply ends.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
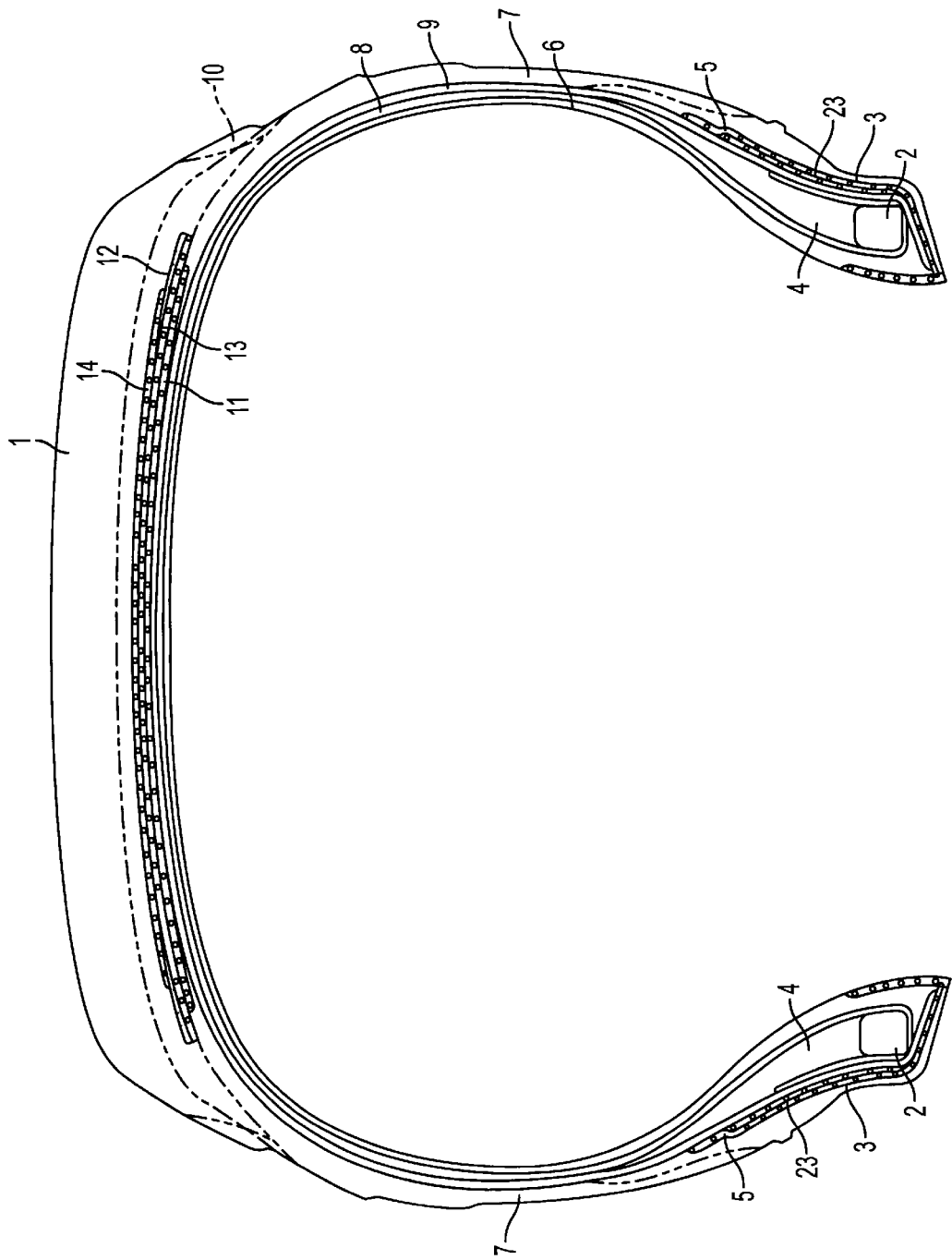
FIG. 1 schematically illustrates a cross sectional view of a tire.
Figure 2:
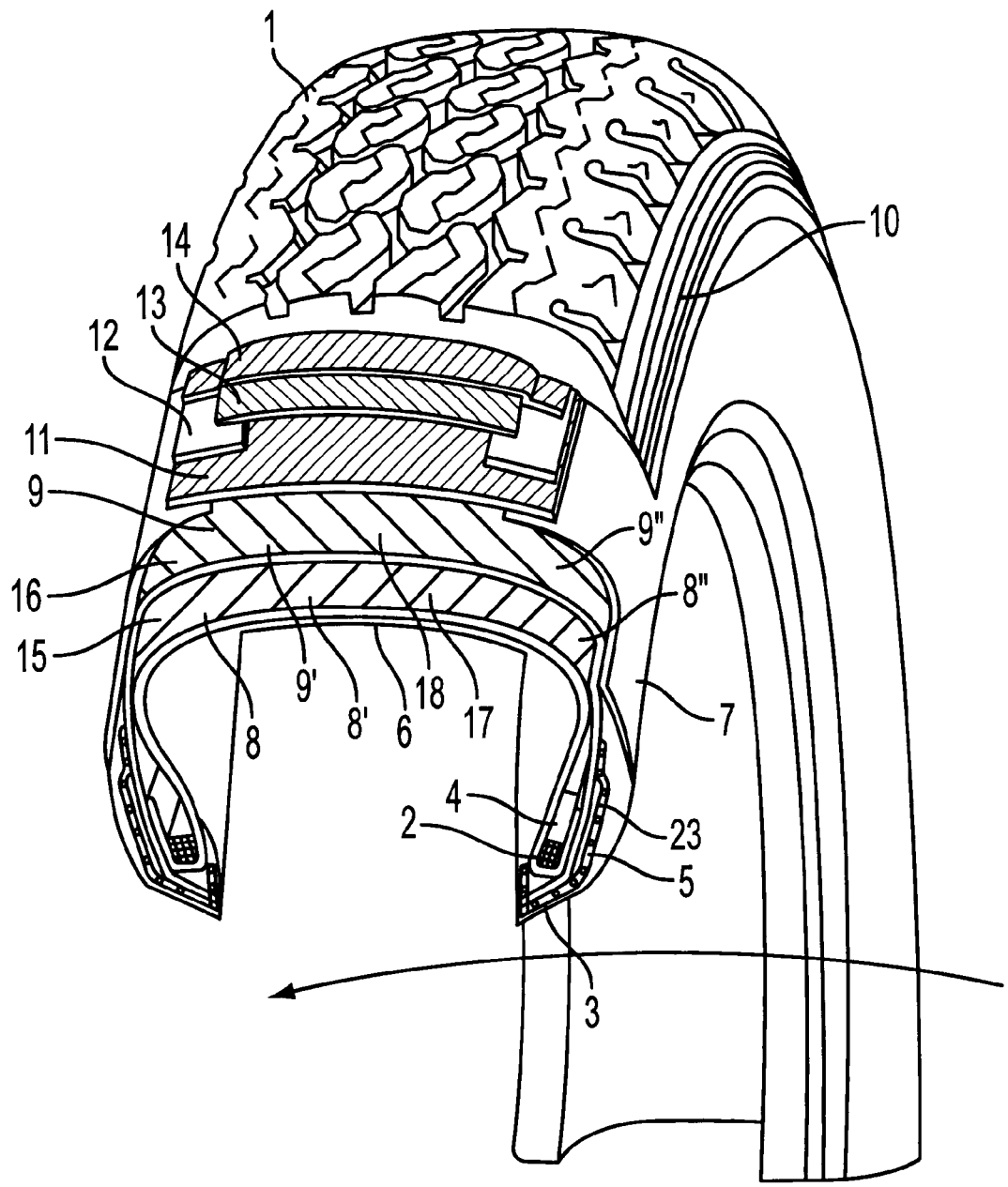
FIG. 2 schematically illustrates a perspective view of a tire structure.

FIGS. 1 and 2 schematically illustrate the structure of a vehicular tire, in which, around a core 2 with a core profile 4, a first carcass ply 8, which can be laid in a conventional manner, extends outside a dense inner layer 6 over a right shoulder region and a zenith plane to a left shoulder region and around a left core 2 with core profile 4. A second carcass ply 9, which can be arranged to likewise extend from the right side of the tire shown in FIG. 1 to the left side, may also be laid in a conventional manner over first carcass ply 8. Both carcass plies 8 and 9 can be manufactured in conventional manners, e.g., from a carcass ply/rubber mixture of known type and rubber strips built up with textile yarns of known construction embedded therein and lying parallel to one another.

These rubber strips can be cut on the bias on a cutting table in a known manner and are then joined to one another at their parallel uncut sides.

For each carcass ply 8 and 9, two carcass ply pieces (or ends) 8' and 8", and 9' and 9", respectively, are shown in FIG. 2. Carcass ply piece 8' is laid on carcass ply piece 8" at a joint 17, such that individual yarns in the respective ends overlap each other. Carcass ply piece 9' can be laid on carcass piece 9" at a joint 18, such that individual yarns in the respective ends overlap each other.

In the exemplary embodiment of FIGS. 1 and 2, a horn profile 5 can be laid in the core region over a chafer 23 and bead reinforcement 3 in a conventional manner. Further, a side strip 7 can be laid, i.e., starting from horn profile 5 and extending into the shoulder region. Several steel belt plies 11 and 13, a nylon bandage 14, and a belt edge protection 12 of a known type positioned between steel belt plies 11 and 13 can be arranged to extend over the circumference of the tire and to lie outside carcass plies 8 and 9. Additionally, shoulder strips 10 can be laid in the shoulder region. In a known manner, tread 1 can complete the tire structure.

Figure 3:
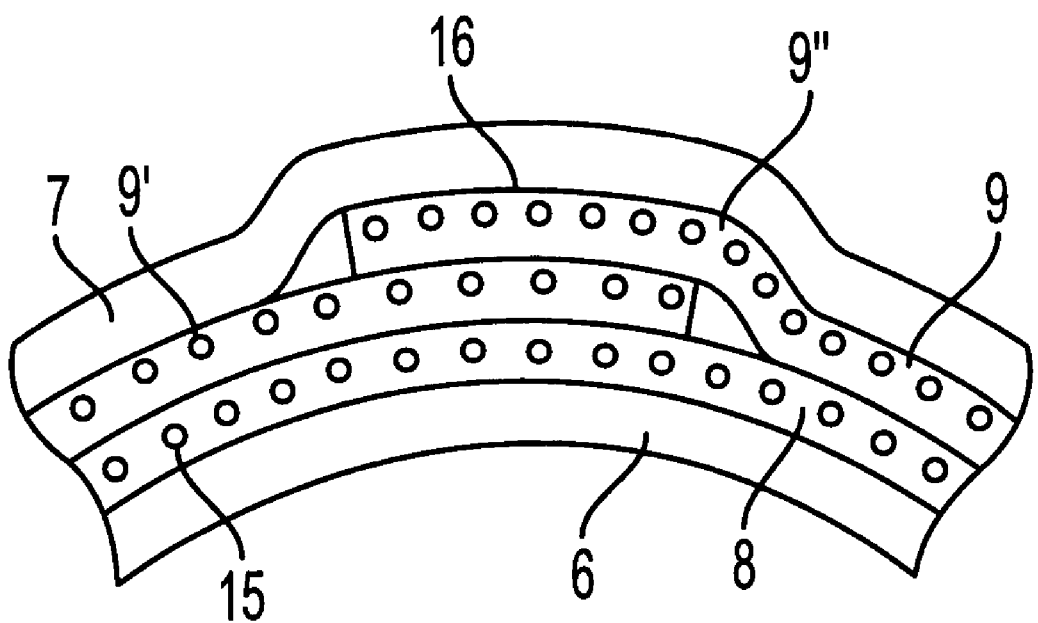
FIG. 3 schematically illustrates the overlapping of carcass ply ends in the building-up process.

In FIG. 3, joint 18, i.e., the overlapping point of the carcass ply pieces 9' and 9", is depicted in a cross-sectional view oriented perpendicular to the carcass yarn. Inner carcass layer 8 can be formed in the known manner with carcass yarn 15. Carcass yarns 15 lie in a central plane of carcass ply 8, and in outer carcass ply 9, carcass yarns 16 are embedded in a central plane of carcass layer 9.

During shaping and vulcanization, carcass yarns 16, particularly polyester carcass yarn, are strongly stretched and subsequently shrunk again. In the course of this shaping and vulcanization, the polyester yarn of joint 18, i.e., the overlapping ends of carcass ply pieces 9", and 9' in the overlapping region of carcass 9, move together tightly. During expansion of the tire, and, therefore, of carcass ply 9, into the operating state with excess pressure in the tire, carcass yarn 16 stretch less in the region of joint 18, due to the overlapping reinforcement or constriction of the sidewall in this region, than carcass yarn 16 located outside of the region of joint 18 or overlapping region of carcass ply ends 9' and 9".

Figure 4:
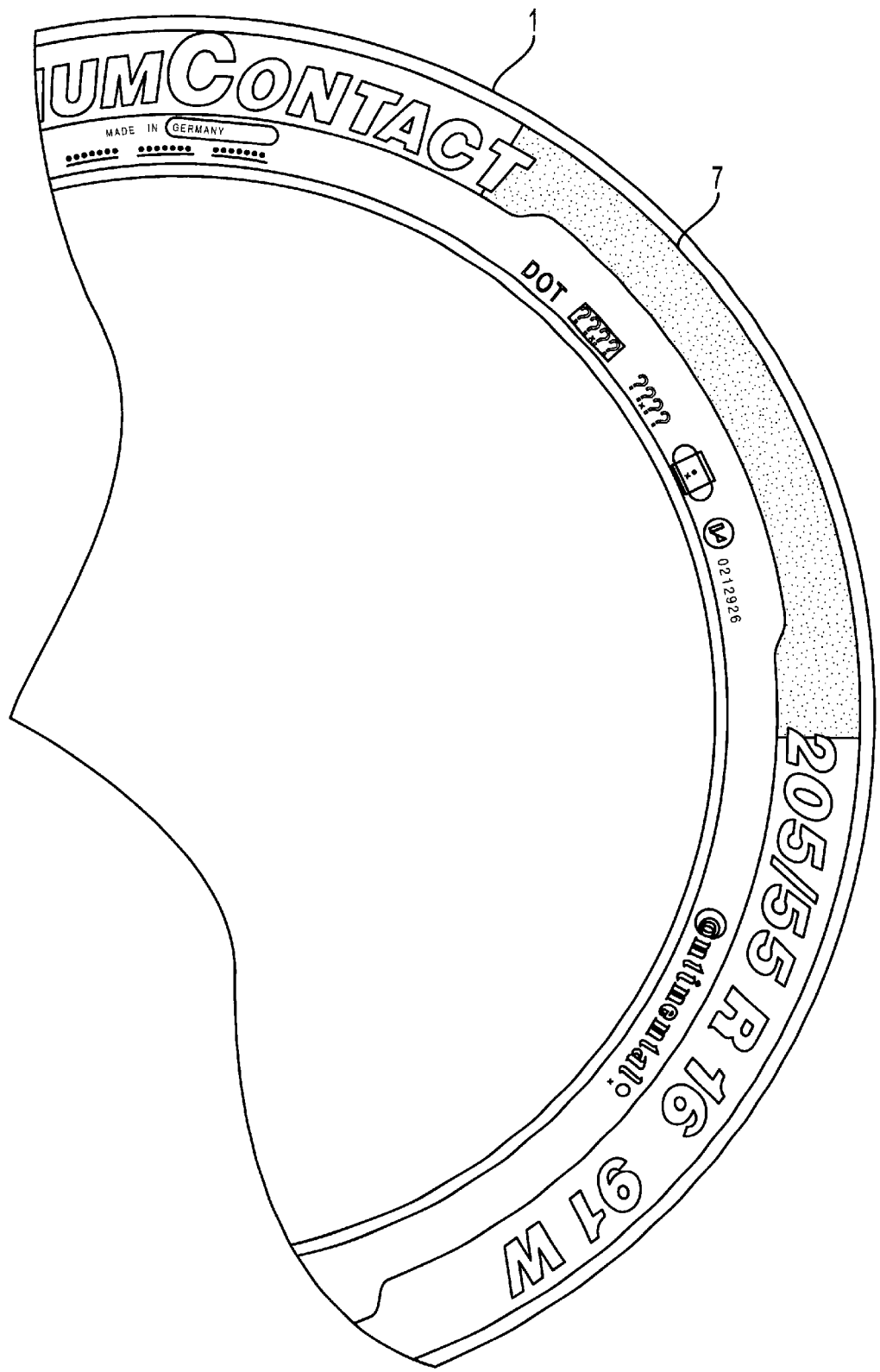
FIG. 4 schematically illustrates a sidewall of a tire with a moiré pattern in accordance with the present invention.

As illustrates in FIG. 4, the tire sidewall can be formed with a sidewall decoration 30 on an outside of sidewall strip 7. Sidewall decoration 30 in this instance is a moiré pattern formed from two overlapping linear patterns. A moiré pattern is an interference figure of at least two overlapping linear patterns in which a brightness distribution arises from interference in the form of a standing wave.

Figure 5A:
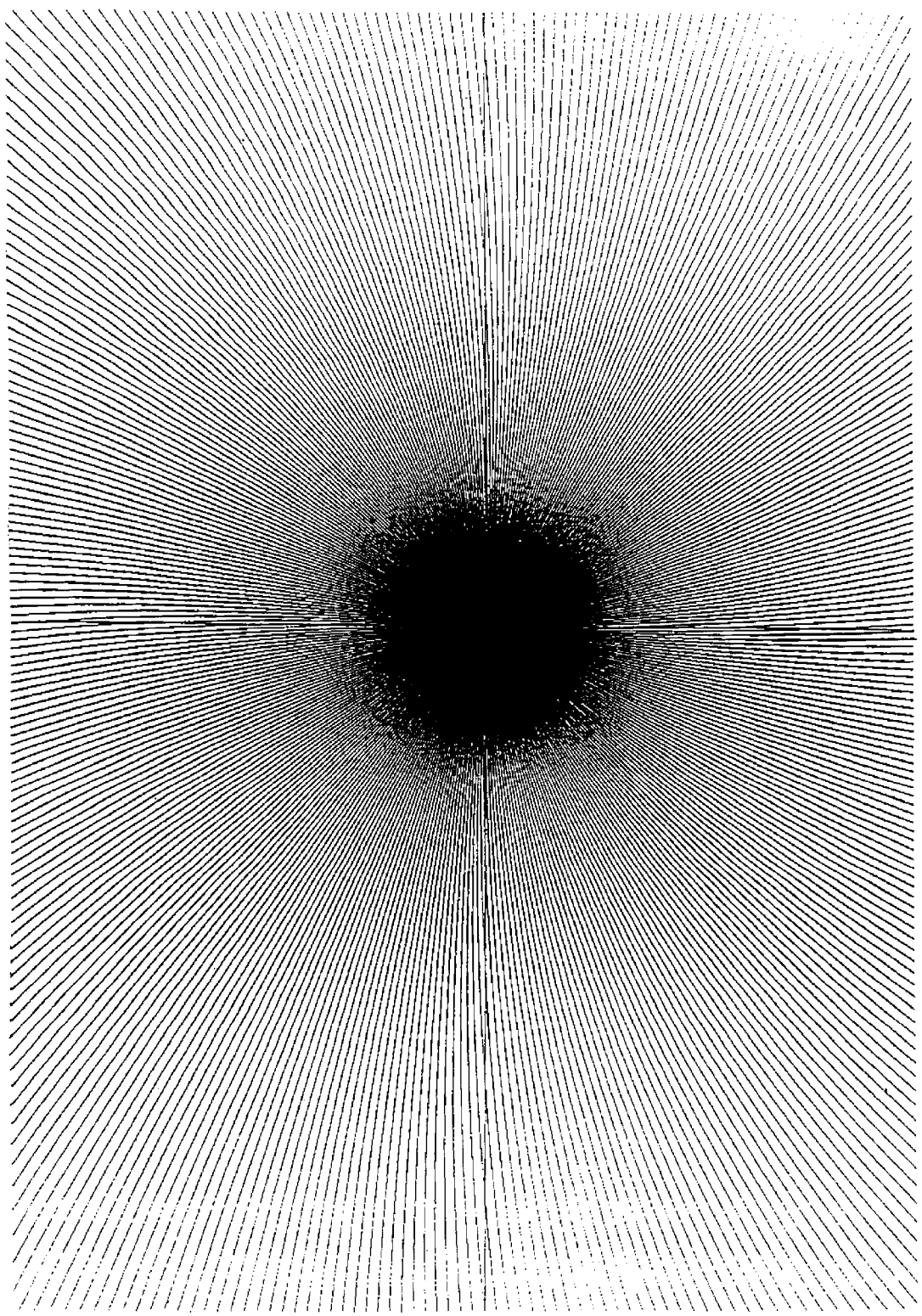
FIGS. 5A-5D illustrate moiré patterns in accordance with the features of the instant invention.
Figure 5B:
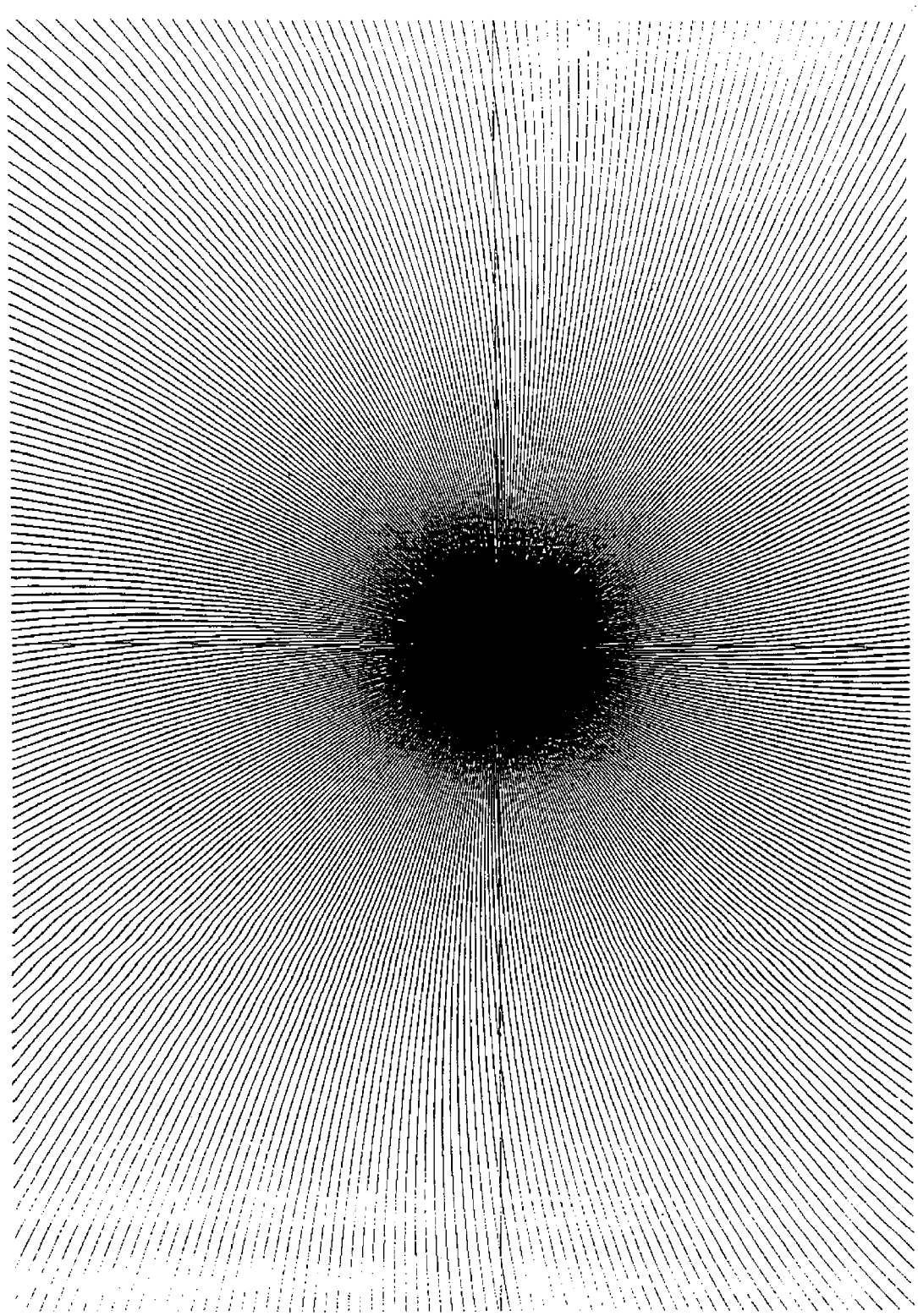
Figure 5C:
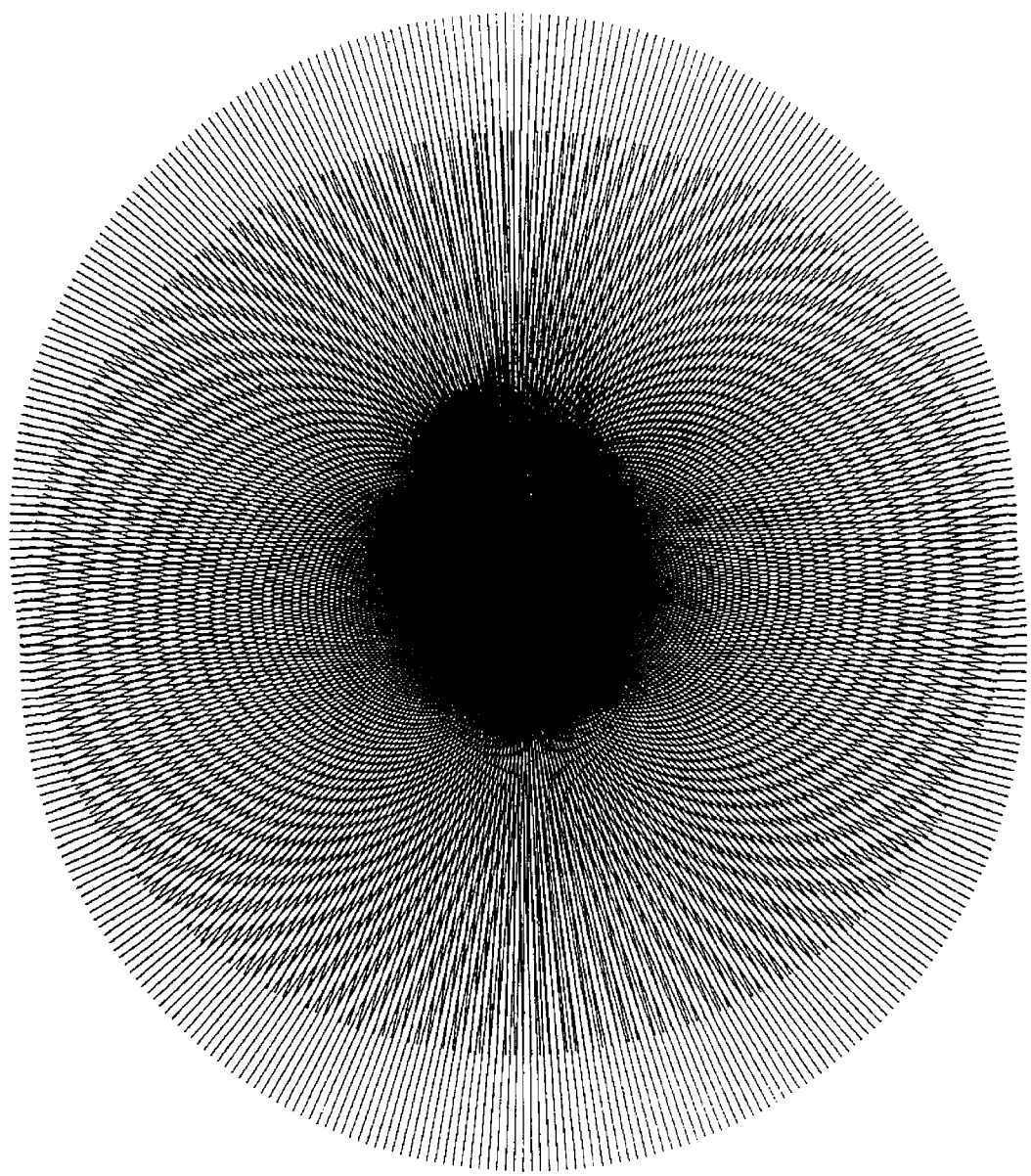

FIG. 5A, e.g., shows a first linear pattern of a first family of curves of a number of curves extending through a common first radiation center in the form of beams at intervals respectively with a same angle $\phi$. The curves may be largely formed radially to the radiation center. In FIG. 5A, the curves can each be formed with an equal, constant curvature. FIG. 5B shows a second linear pattern of a second family of curves of a number of curves extending through a common second radiation center in the form of beams at intervals, each with a same angle $\psi$. The curves are largely formed radially to the radiation center. In FIG. 5B, the curves can each be formed with an equal, constant curvature. A beam density and a curvature of the two families of curves can each be the same in FIGS. 5A and 5B. In FIG. 5C, the two families of curves of FIGS. 5A and 5B are shown superposed such that the two radiation centers are slightly displaced from one another at an interval of 1>0 mm. In this manner, an interference figure of the two families of curves arises, as depicted in FIG. 5C, with particularly bright regions which occur in a region of intersection points of the lines. Thus, the total interference depicted in FIG. 5C exhibits a brightness distribution as in a wave-form spreading with a standing wave.

A partial region of FIG. 5C can reproduced on sidewall 7 as sidewall decoration 30. In sidewall decoration 30, the dark lines of the families of curves can be finely impressed or embossed grooves in the rubber surface. Further, the grooves can exhibit a round or square cross-section contour.

The irregular brightness distribution produced by the moiré effect on the sidewall is superposed on the variation in the brightness distribution produced by the constriction of the tire sidewall. The variation in the brightness distribution produced by the constriction of the tire sidewall is no longer clearly identifiable as such. Only a non-uniform brightness distribution apparently produced by the tire decoration is recognizable.

Figure 5D:
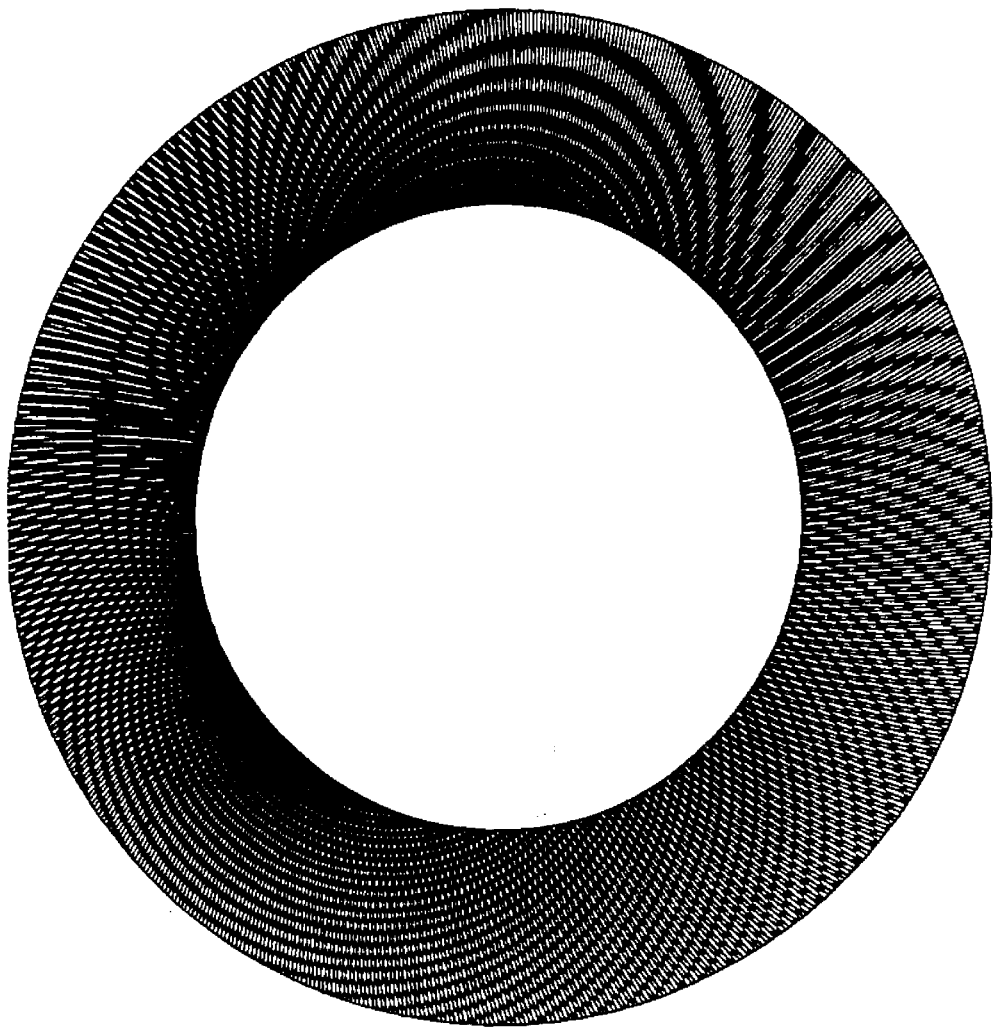
Figure 6A:
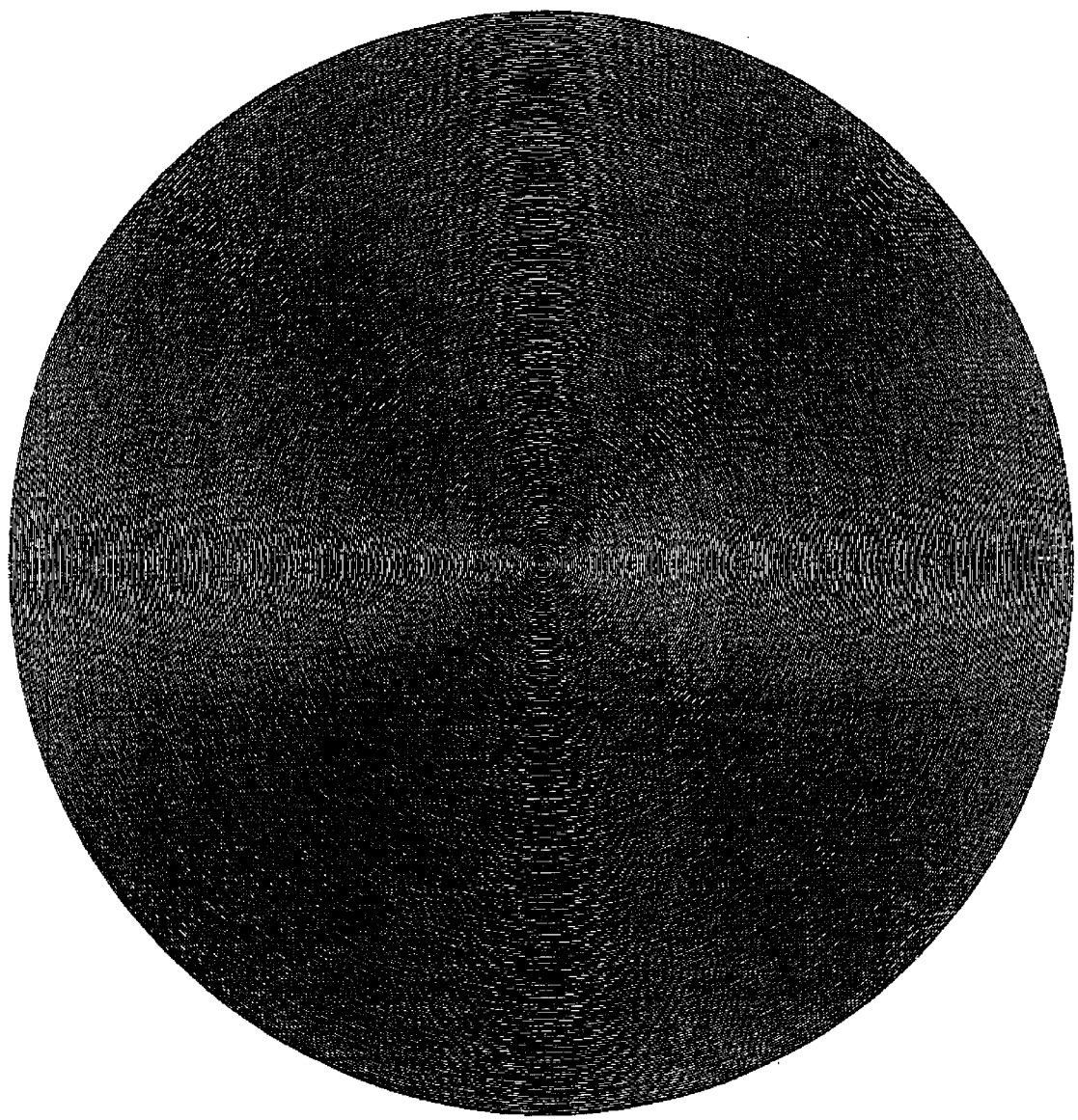
FIGS. 6A and 6B illustrate alternative moiré patterns for use in the instant invention.
Figure 6B:
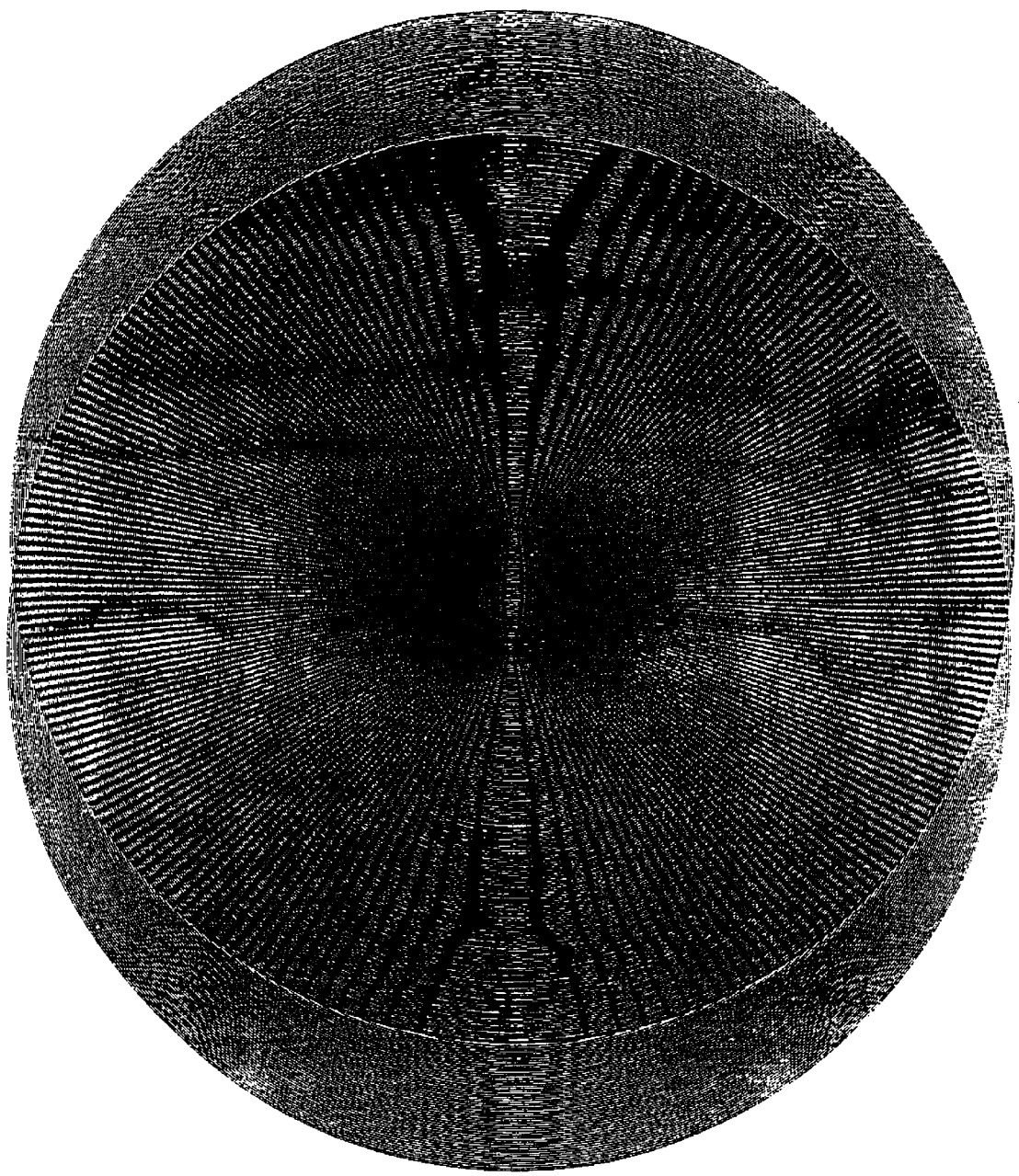

FIG. 5D shows an interference figure similar to that depicted in FIG. 5C, but with thicker lines of the families of curves.

Figure 7A:
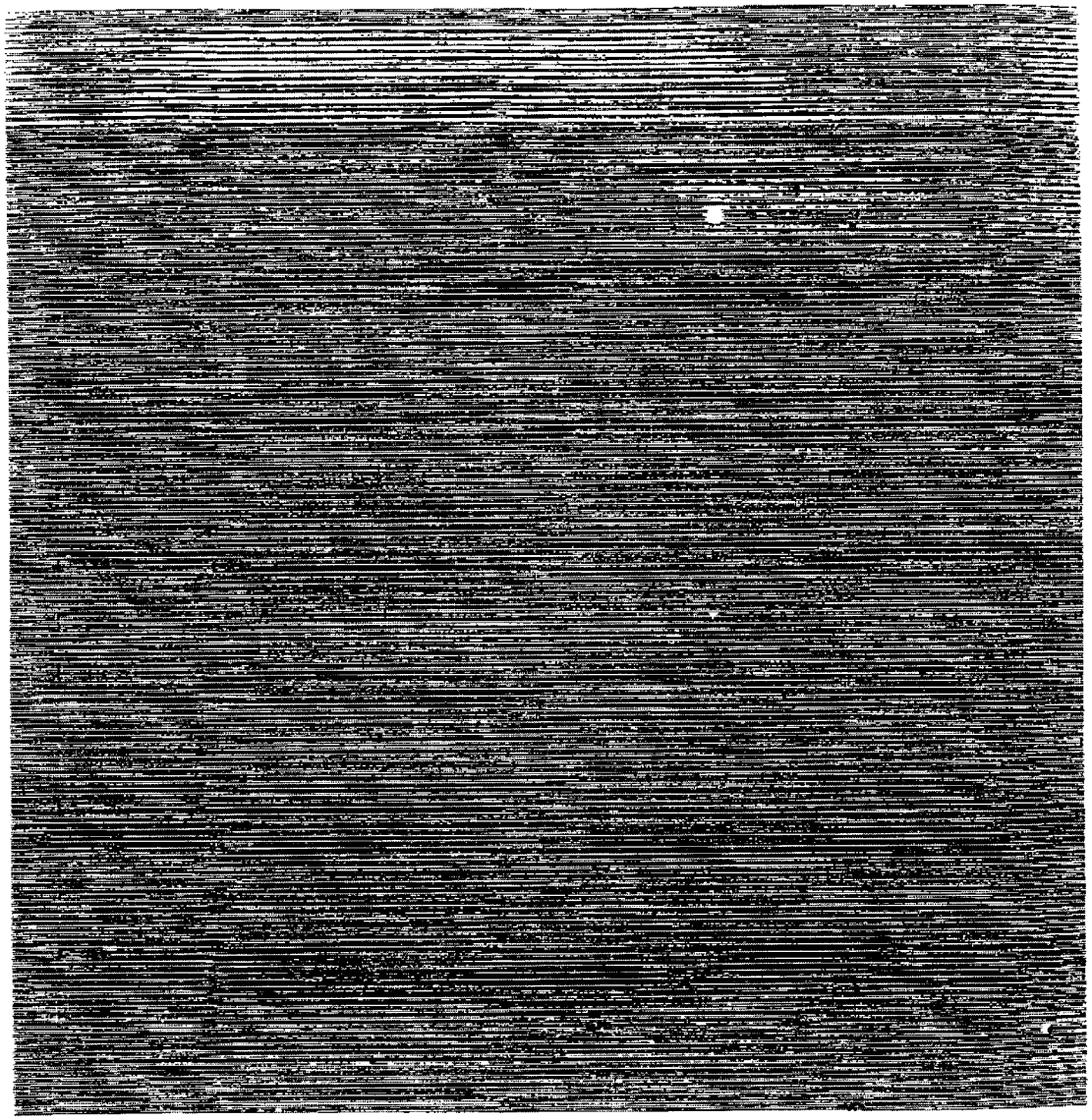
FIGS. 7A-7C illustrates another alternative moiré pattern for use in the present invention.
Figure 7B:
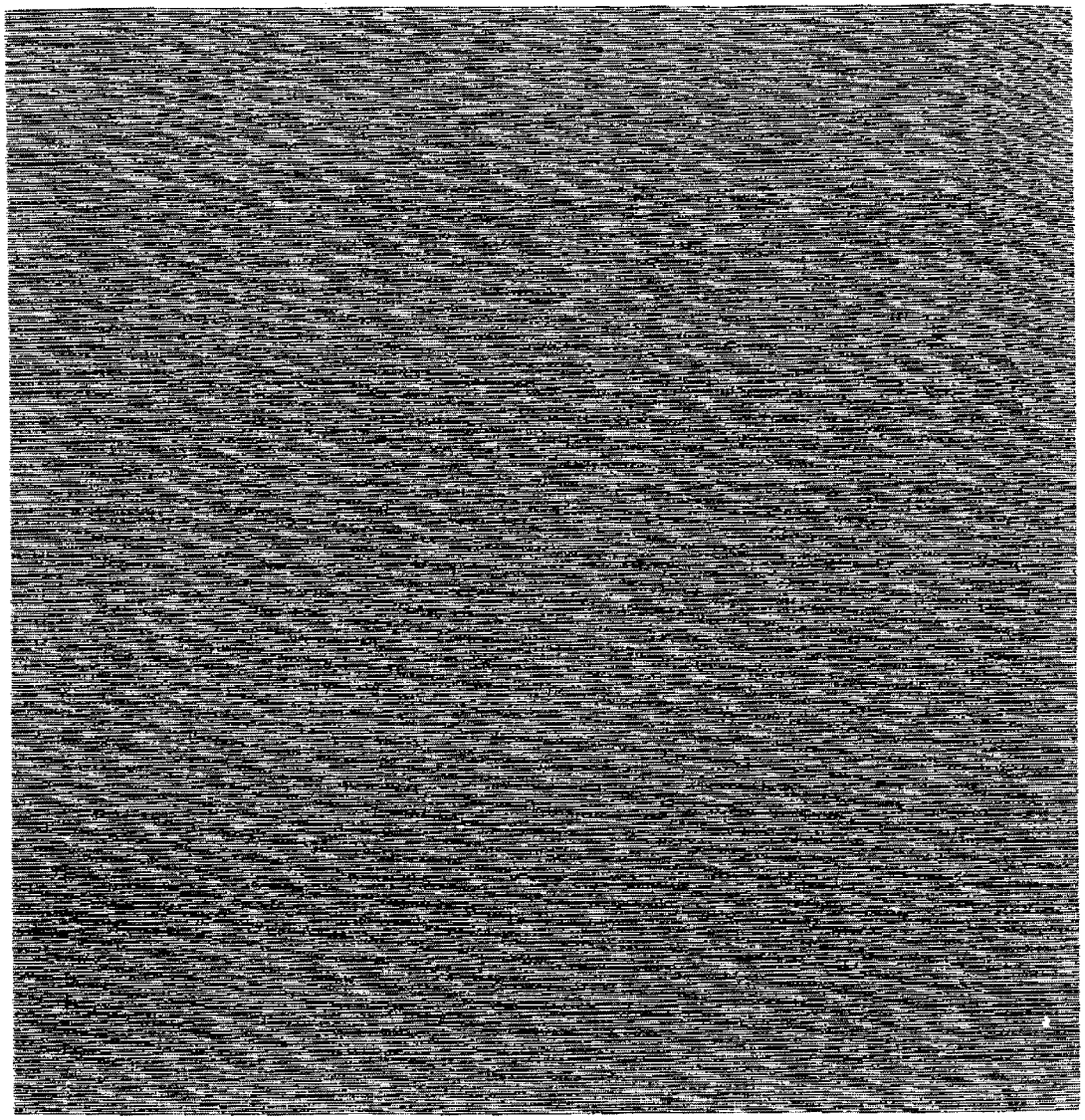
Figure 7C:
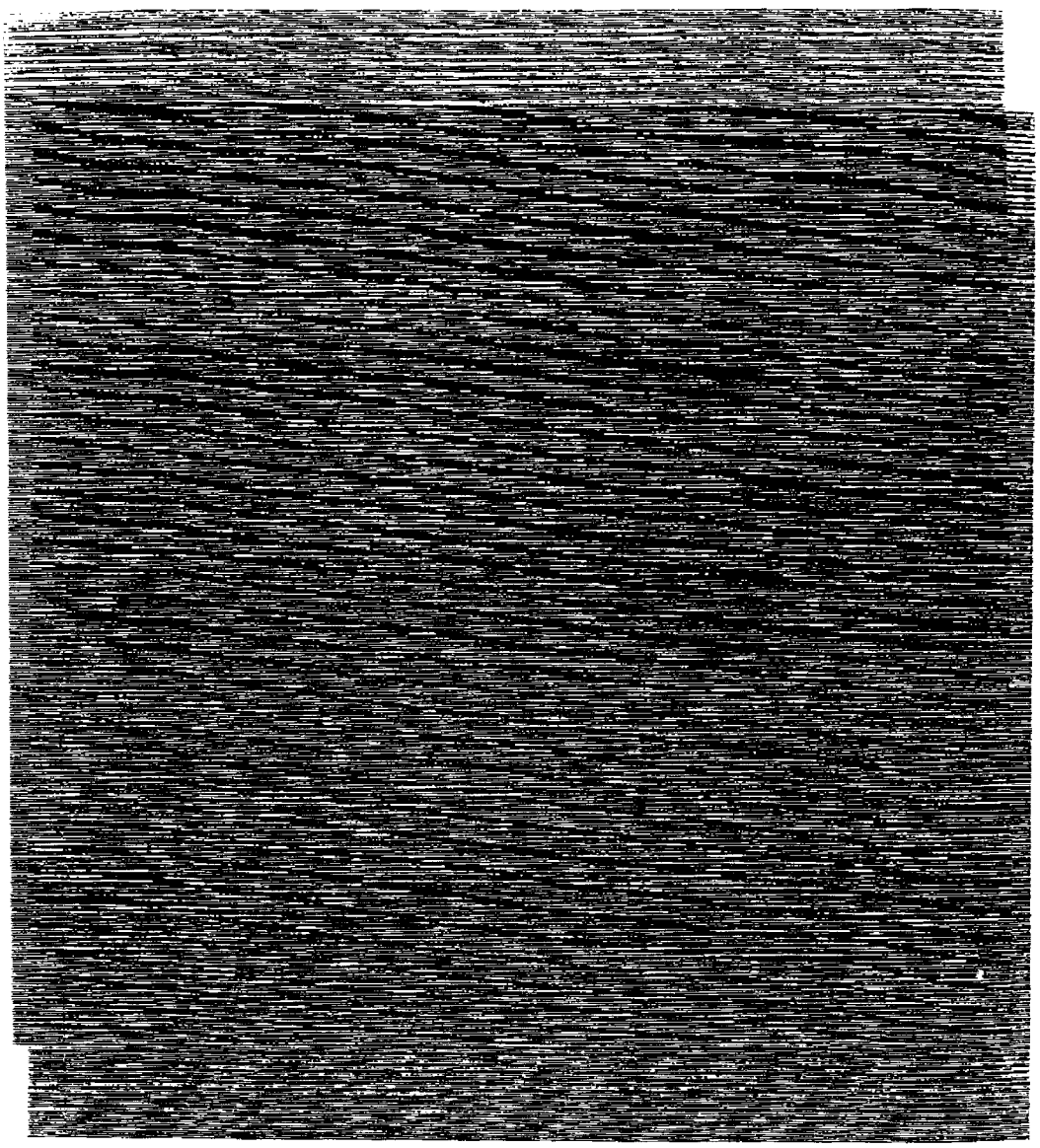

FIGS. 6A and 6B and 7A–7C each show an alternative embodiment of an interference figure. According to FIG. 6B, a moiré pattern can be produced by superposing two families of curves shown in FIG. 6A having line interval differences of $1.01 \leq a \leq 1.1$. Each family of curves can be a family of concentric circles formed respectively at a same radial interval from one another, and the two centers may be displaced from one another at an interval of 1>0 mm. FIG. 7C shows an interference figure of a first family of curves shown in FIG. 7A, e.g., parallel curves formed equidistant from one another at an interval L1, and of a second family of curves shown in FIG. 7B, e.g., parallel curves formed equidistant to one another at an interval L2. The curves of the first family of curves can intersect those of the second family of curves as shown, e.g., in FIG. 7C. In this case, the intervals L1 and L2 can be the same. However, the curves of the first family of curves can also be formed parallel to those of the second family of curves. In this case, intervals l1 between the curves of the first family of curves are greater than intervals l2 between the curves of the second family of curves, where 1.1*l2>l1>1.01*l2.

It is also conceivable to form carcass yarns from a material other than polyester yarn. It makes particular sense to form a tire sidewall decoration with a moiré pattern for tires in which a particularly high risk of recognizable constrictions occurs.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE CHARACTERS

1. Tread
2. Core
3. Bead reinforcement
4. Core profile
5. Horn profile
6. Inner layer
7. Side strip
8. Carcass ply
9. Carcass ply
10. Shoulder strip
11. Belt ply
12. Belt edge protection
13. Belt ply
14. Belt ply
15. Carcass yarn
16. Carcass yarn
17. Overlapping points
18. Overlapping points
19. Rubber layer
20. Bead strip
30. Sidewall decoration

What is claimed:

1. A vehicular tire comprising:
   a carcass made of rubber;
   sidewalls;
   tread;
   said carcass, in a side-wall region, comprising at least one carcass ply having parallel textile reinforcements embedded in the rubber and two carcass ply ends;
   said two carcass ply ends being arranged to overlap in a circumferential direction, thereby forming an overlapping point;
   a sidewall rubber strip positioned to cover said carcass in said sidewall region; and
   a moiré pattern being formed on said sidewall rubber strip.

2. The vehicular tire in accordance with claim 1, wherein said moiré pattern comprises a number of linear elevations assigned to at least two non-identical families of curves.

3. The vehicular tire in accordance with claim 2, wherein at least one family of curves are formed from curves formed respectively parallel to one another.

4. The vehicular tire in accordance with claim 3, wherein the at least one family of curves comprises at least two families of curves, and
   the curves of the at least two families of curves are formed from curves formed respectively parallel to one another.

5. The vehicular tire in accordance with claim 4, wherein the curves of the at least two families of curves are formed from curves formed respectively parallel to one another.

6. The vehicular tire in accordance with claim 5, wherein the two families of curves intersect one another.

7. The vehicular tire in accordance with claim 4, wherein curves of a first of the two families of curves are formed at an interval r1 to one another, wherein curves of a second of the two families of curves are formed at an interval r2 to one another, and wherein r1=a*r2, where a is not an integer.

8. The vehicular tire in accordance with claim 7, wherein $1.01 \leq a \leq 1.1$.

9. The vehicular tire in accordance with claim 3, wherein the at least one family of curves comprises at least two families of curves, and
   the curves of at least two families of curves are formed from linear curves formed respectively parallel to one another.

10. The vehicular tire in accordance with claim 9, wherein curves of a first of the two families of curves are formed at an interval r1 to one another, wherein curves of a second of the two families of curves are formed at an interval r2 to one another, and wherein r1=a*r2, where a is not an integer.

11. The vehicular tire in accordance with claim 10, wherein $1.01 \leq a \leq 1.1$.

12. The vehicular tire in accordance with claim 1, wherein the at least one family of curves are formed from curves formed respectively point-symmetrically.

13. The vehicular tire in accordance with claim 12, wherein the at least one family of curves comprises at least two families of curves, and
   both of the at least two families of curves are formed respectively point-symmetrically.

14. The vehicular tire in accordance with claim 13, wherein points of symmetry of the point-symmetric families of curves are displaced from one another at an interval l.

15. The vehicular tire in accordance with claim 12, wherein the curves of the at least one family of curves are concentric circles.

16. The vehicular tire in accordance with claim 15, wherein the at least one family of curves comprises at least two families of curves having curves of concentric circles with a same center, wherein curves of a first of the two families of curves are formed at a radial interval r1 to one another, wherein curves of a second of the two families of curves are formed at a radial interval r2 to one another, and wherein r1=a*r2, where a is not an integer.

17. The vehicular tire in accordance with claim 12, wherein the at least one family of curves is formed as a family of beams through a point of symmetry.

18. The vehicular tire in accordance with claim 17, wherein equal angles are provided between respectively adjacent beams.

19. The vehicular tire in accordance with claim 17, wherein the at least one family of curves comprises at least two families of curves formed as a family of beams through a same point of symmetry, wherein adjacent beams of a first of the two families of curves are formed with a same angle $\alpha$ between respectively adjacent beams, wherein adjacent beams of a second of the two families of curves are formed with a same angle $\beta$ between adjacent beams, and wherein $\alpha=a*\beta$, where a is not an integer.

20. The vehicular tire in accordance with claim 19, wherein $1.01 \leq a \leq 1.1$.

21. The vehicular tire in accordance with claim 1, wherein curves of the at least one family of curves in a two-dimensional system of coordinates (x1; x2) perpendicular to a coordinate line (x1) intersect it at the zero values of a sine function $f(x1)=\sin(x1_0+b*x1)$ where $x1_0$=constant, b=constant.

22. The vehicular tire in accordance with claim 21, wherein the at least one family of curves comprises at least two families of curves, wherein curves of a first of the two families of curves in a two-dimensional system of coordinates (x1; x2) perpendicular to a coordinate line (x1) intersect it at the zero values of a sine function $f(x1)=\sin(x1_0+b*x1)$ where $x1_0$=constant, b=constant, wherein curves of a second of the two families of curves in a two-dimensional system of coordinates (x3; x4) perpendicular to a coordinate line (x3) intersect it at the zero values of a sine function $f(x3)=\sin(x3_0+c*x3)$ where $x3_0$=constant, c=constant, and wherein at least one of:
  (A) one of the systems of coordinates (x1; x2) and (x3; x4) of the families of curves are not identical,
  (B) phase shifts $x1_0$, $x3_0$ of the families of curves are not identical, and
  (C) frequencies b and c of the families of curves are not identical.

23. The vehicular tire in accordance with claim 22, wherein, for the frequencies b and c of the families of curves, b=a*c, where a is not an integer, and where $1.05 \leq a \leq 1.1$.

24. The vehicular tire in accordance with claim 22, wherein, for the phase shifts, $x1_0$ and $x3_0$ of the families of curves, $x1_0=a*x3_0$, where a is not an integer, and where $1.05 \leq a \leq 1.1$.

25. The vehicular tire in accordance with claim 22, wherein at least one of the two systems of coordinates (x1; x2) and (x3; x4) of the families of curves are Cartesian coordinate systems.

26. The vehicular tire in accordance with claim 25, wherein both of the two systems of coordinates of the families of curves are Cartesian coordinate systems.

27. The vehicular tire in accordance with claim 26, wherein at least one of the two systems of coordinates (x1; x2) and (x3; x4) of the families of curves are curvilinear coordinate systems.

28. The vehicular tire in accordance with claim 27, wherein both of the two systems of coordinates of the families of curves are curvilinear coordinate systems.

29. The vehicular tire in accordance with claim 22, wherein at least one of the two systems of coordinates (x1; x2) and (x3; x4) of the families of curves are polar coordinate systems.

30. The vehicular tire in accordance with claim 29, wherein both of the two systems of coordinates of the families of curves are polar coordinate systems.

31. A process of making a vehicular tire having a carcass, sidewalls, and tread, wherein the carcass is made of rubber and includes parallel textile reinforcements embedded in the rubber and two carcass ply ends, the process comprising:
  circumferentially overlapping the two carcass ply ends of the carcass, thereby forming an overlapping region;
  covering the overlapping region on the outside with a sidewall rubber strip; and
  forming a moiré pattern on the sidewall rubber strip.

32. A process of masking an overlapping portion of carcass ply ends in a vehicular tire having a carcass, sidewalls, and tread, the process comprising:
  creating a moiré pattern;
  forming the moiré pattern on an outside surface of the sidewall in a region of the overlapping portion of the carcass ply ends.

* * * * *